3,159,746
APPARATUS FOR MEASURING A CHARACTERISTIC OF A MOVING FILLER IN A CONTINUOUS ROD MACHINE AND RECORDING VARIATIONS THEREIN
Gordon Francis Wellington Powell, Frederick Pocock, and Richard Graham Crosland, London, England, assignors to Molins Machine Company Limited, a British company
Filed July 6, 1959, Ser. No. 825,633
Claims priority, application Great Britain, July 4, 1958, 21,486/58
11 Claims. (Cl. 250—83.3)

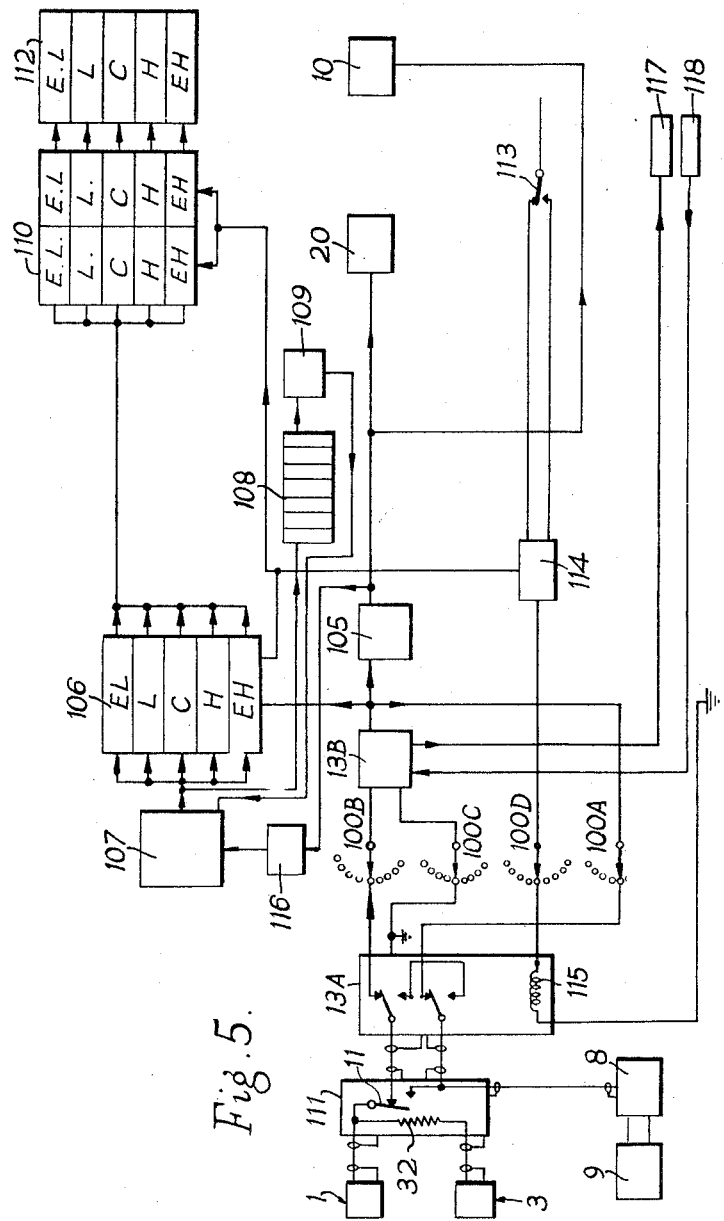

This invention concerns improvements in apparatus for measuring a characteristic (e.g. mass, size, moisture content, draw) of a continuously moving stream of material e.g. of tobacco, for example, an unwrapped tobacco filler, or a cigarette rod, in a continuous-rod cigarette making machine such apparatus having recorders associated therewith whereby records of changes in the characteristic of the filler or rod may be recorded. Such a filler could be a continuous mouthpiece rod for making mouthpieces for cigarettes. For brevity the word "filler" will be used to cover either unwrapped or wrapped tobacco. By draw is meant the resistance to airflow therethrough of the filler, which resistance will be the same as, or closely correlated with, the draw of the cigarette as experienced by the smoker. As the draw is dependent on the degree of compacting of the tobacco and the mass is dependent on the degree of compacting and the size there is a close correlation between mass and draw, especially if the size is constant.

Measuring the characteristics of such fillers has been effected in various ways by devices which give an electrical signal, such as radiation gauges or dielectric gauges, the latter being particularly sensitive to changes of moisture content. Another way of measuring an unwrapped filler is to pass air through it and obtain the resistance to flow or draw and thus an indication of the mass. For these pneumatic gauges it is necessary to employ a transducer to convert their outputs into an electrical signal. In the following text the word gauge will be deemed to mean any such device by which a characteristic of the filler or, more usually, changes therein, can be caused to give an electrical signal.

In the previous paragraph reference has been made to the use of pneumatic gauges. In U.S. Patent No. 2,952,-262, patented September 13, 1960, there is described a gauge comprising an aperture through which a cigarette rod passes with a small clearance and any changes in clearance cause differences in the pressure of air fed into the aperture. This gauge, which strictly speaking measures the size of the rod, could be used for the present purpose to measure size or to measure mass as it has been found that there is a fairly close relationship between size and mass in these rods. As it may not be as accurate as the pneumatic gauge first referred to, the choice will depend chiefly on the accuracy of the checking of the machine it is desired to achieve.

It is known to provide radiation gauges used for determining the thickness of a moving web, or the mass of a moving mass of material such as a stream of tobacco or other material formed of discrete fragments, or particles, with chart recorders which record gauge readings on a moving paper chart by a pen or like traces. In the formation of tobacco fillers such as are made on continuous rod cigarette machines such recorders have hitherto only been arranged to show readings of average mass, that is the pen traces a curve any point on which represents an average value over a fairly short period. The gauge circuits comprise a time-constant device for effecting such averaging. In a time of one second a continuous-rod cigarette machine makes twenty or more cigarettes and thus even a short time-constant such as is used will only give a chart showing the average mass of several successive cigarettes and it is desirable, at least for the purpose of investigating the performance of the machine, to have a record over time intervals corresponding approximately, say, to the time taken to make one cigarette.

The present invention provides a gauge as defined above and a circuit and apparatus in which a recorder is arranged to draw a curve showing performance over very short intervals of time.

In a modified form the invention further provides a numerical record of zonal deviations of the measured quantities from a datum line. Thus with this modified form it is possible to say how many cigarettes have been produced in a given time in each zone. Normally, apparatus according to the invention is only used for a few minutes and at very long intervals say, once a day, and it is preferably constructed in portable form, with arrangements for plugging in to any machine in a factory.

According to one aspect of the invention there is provided apparatus for checking a characteristic (e.g. mass, size, moisture content, draw) of individual rod-like articles (e.g. cigarettes produced by a continuous-rod cigarette-making machine) comprising a gauge arranged to measure the characteristic of the filler as it passes the gauge and produce an electrical signal depending on the characteristic, an electrometer-amplifier connected to the gauge, a power amplifier fed by said electrometer-amplifier, a chart recorder having a pen driven by the power amplifier, the said apparatus being arranged to draw a graph on the chart showing deviations in filler characteristic over lengths of filler substantially of the order of a cigarette length. The gauge may be a radiation gauge, a dielectric gauge, or a pneumatic gauge capable of producing an electrical signal. The electrometer-amplifier is preferably a D.C. instrument since where a radiation gauge is used, ionization current is very small and in other cases only very small currents are available initially.

As the principal use of such a chart is for statistical purposes, or the detailed investigation of the performance of the machine, the apparatus may be arranged in portable form so that it can be plugged in to a machine equipped with existing gauge control apparatus, for example radiation gauge control as shown in U.S. Patent No. 2,832,352, and in such case the invention comprises the combination of the present apparatus and said control with a common gauge, and switching devices and feedback devices whereby the existing gauge control continues to function normally but its electrometer is fed from the electrometer-amplifier of the said apparatus.

In combination with apparatus as set forth in the preceding two paragraphs said apparatus may comprise an amplifier, e.g., an additional amplifier, which operates a stylus movable over a range of contacts, each such contact being connected to a high-speed relay and each such relay controlling an electrical integrator whereby the time spent by the stylus over each contact may be recorded. Such time (assuming a constant machine speed) indicates a number of cigarettes made while the corresponding contact is engaged by the stylus. It will be appreciated that the space between neighbouring contacts constitutes a zone and the showing on a meter is therefore a numerical record of zonal deviations as mentioned above.

The said apparatus may comprise a calibrating device for drawing datum lines on the chart to show the amplitude at which the integrator zones are working.

Further according to the invention there is provided apparatus for checking variations in a characteristic (e.g. mass, size, moisture content, draw) of rod like articles e.g. cigarettes produced by a continuous-rod cigarette-making machine) comprising a gauge responsive to changes in the characteristic of the moving filler in the machine and comprising means for producing electrical signals which vary with changes in filler characteristic averaged over a length of filler substantially equal to the length of the cigarettes produced by said machine and means for recording such averaged signals whereby the characteristic (expressed as within a chosen tolerance) of individual cigarettes produced from the filler may be ascertained.

It is not possible, nor necessary, to know the precise characteristic of each cigarette since the object is to check the performance of the machine to help to bring it to the highest possible commercial efficiency and the words "expressed as within a chosen tolerance" mean that all the cigarettes whose characteristic comes within that tolerance are considered as being alike.

Where the results of the operation of the apparatus are to be recorded on counters the signals may be employed to cause the operation of the appropriate counters through a suitable discriminator corresponding in function with the aforesaid stylus.

The apparatus may be arranged for use in large machine rooms in which case the records may be produced at a convenient centre or monitoring station provided with power supplies and switching devices whereby any machine in the room may be tested and its output recorded. For this purpose the machine may be provided with an impedance converter connected to said centre and supplied with power therefrom.

Further according to the invention there is provided apparatus for checking variations in a characteristic (e.g. mass, size, moisture content, draw) of rod like articles (e.g. cigarettes produced by a continuous-rod cigarette-making machine) comprising a gauge responsive to changes in the characteristic of the moving filler in the machine and comprising means for producing electrical signals which vary with changes in the filler characteristic averaged over a length of filler substantially equal to the length of the cigarettes produced by said machine, means for recording such averaged signals whereby the characteristic (expressed as within a chosen tolerance) of individual cigarettes produced from the filler may be ascertained, the last said means being positioned at a place remote from the machine, to which they are electrically connected, and said machine having an impedance converter (e.g. a high-speed electrometer) connected to the means at said remote place.

Such apparatus is intended for checking numbers of machines and therefore normally comprises switching devices for connecting each machine as desired to the recording means.

In order to discriminate between the signals due to cigarettes whose characteristic comes within the several tolerances, depending on the degree of analysis it is desired to achieve, the counters, if employed, may be operated by pulses from a pulse generator, such as an oscillator, and the signals themselves may be employed to operate a discriminator having the desired number of channels, according to the number of tolerances chosen, so that a series of pulses go through a particular channel while a particular length of filler is being gauged. The generator may be arranged to deliver a predetermined number of pulses, for example under the control of dekatron counters.

In all cases the machine may have the normal control over the tobacco supply to the filler, being tested, such as radiation gauge control, with a suitable recorder for showing readings of average characteristic over a length of filler corresponding to the lengths of several successive cigarettes and then the apparatus according to the present invention comprises switching and feedback devices whereby said normal control is caused to function as usual while the testing of the machine by the present apparatus is being effected. When checking from a monitoring station a drift-corrected D.C. amplifier may be used with the present apparatus so that the output fed back to the normal control is in the right phase. However, the recorder of said normal control may be at the monitoring station in which case one recorder will serve for all machines in turn.

The invention will be more fully described with reference to the accompanying drawings, in which:

FIGURE 5 is a diagram of the electrical equipment needed for a layout such as that shown in FIGURE 3.

Figure 1:
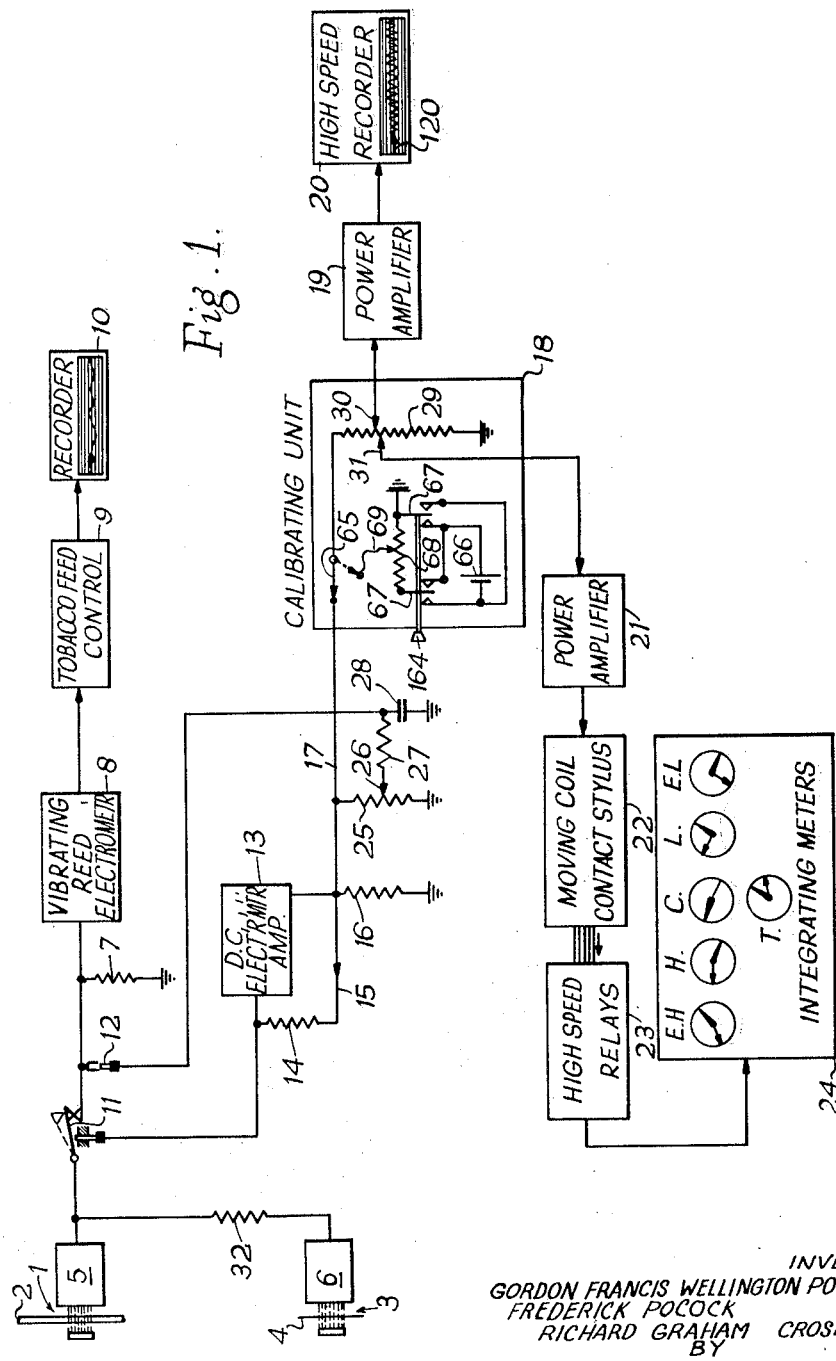
FIGURE 1 shows in diagrammatic form typical radiation gauge apparatus as used on cigarette machines and having a recorder attached, together with apparatus according to the present invention.

Referring to FIGURE 1, a radiation gauge 1 is shown scanning a cigarette rod 2 and an absorber 4 is shown in the path of radiation from another radiation gauge 3. The ionization chamber 5 of the gauge 1 is connected with a similar chamber 6 of the gauge 3. D.C. voltage sources for the chambers are omitted for simplicity since radiation gauges are well known. The gauge 3 with its absorber acts in the known manner as a balancer as its absorber is nominally equivalent to the desired mass of the rod 2 passing through the other gauge. The difference between the chamber outputs due to variations in rod mass is fed to a resistor 7 to develop a D.C. voltage across it. This voltage is converted to A.C. by a vibrating reed electrometer 8. Associated with the electrometer are an amplifier and a phase-sensitive rectifier by which the A.C. is amplified and converted back to D.C. These components and their associated apparatus may be regarded as included in the block diagram 8. Apparatus of this general kind is shown in detail in U.S. Patent No. 2,832,352, patented April 29, 1958, to which reference may be made. The output operates further devices within the block 9 marked "Tobacco Feed Control" whereby the speed of the tobacco hopper is regulated, for example, as described in said patent. A line leads from the block 9 to a chart recorder 10, such a recorder being an optional feature in this kind of apparatus. The electrometer at 8 only gives a slowly changing signal (assuming the mass of tobacco is changing, which is in fact what nearly always happens) but this signal is adequate for tobacco feed control.

The charts from a recorder such as 10, which may be considered as a long-term recorder, are however too coarse for an analysis of the machine's performance based on a comparison of individual cigarettes and the invention provides apparatus for this purpose which will be outlined with reference to FIGURE 1 and thereafter described in more detail with reference to FIGURE 2.

In the line leading from the ionization chambers to the electrometer 8 there is a switch 11 whereby the circuit may be broken and a plug 12 whose purpose is described below. From the switch 11 when the latter is pushed to the broken line position, there is a circuit to a D.C. electrometer-amplifier 13 referred to hereafter as a D.C. amplifier having an input resistor 14 and arranged for 100% feed back along line 15 thus giving a gain of minus one. From the output side of the amplifier, which is grounded through an output load resistor 16, there is a line 17 leading to a block 18 marked "Calibrating Unit" which will be described subsequently and two lines run from this unit, one to a power amplifier 19 and thence to another recorder 20 marked "High Speed Recorder," and the other to a further power amplifier 21 and from thence to a block 22 marked "Moving Coil Contact Stylus." Five lines from the block 22 lead to another 23 marked "High Speed Relays," of which there are five, described below, and lines from these relays lead to a block 24 marked "Integrating Meters" containing six meters marked E.L.-L-C-H-E.H. and T. These letters stand for the words Extra Light-Light-Correct-Heavy-Extra Heavy and Total respectively and refer to weights of cigarettes, as determined by the radiation gauge which measures rod mass in the known manner. As will appear later, the chart produced by the recorder 20 shows mass variations over cigarette lengths or even shorter lengths of cigarette rod and for the purpose of checking the machine the apparatus described in this paragraph is switched into circuit for a few minutes only. But it is undesirable that machine control should cease during this short interval and the plug 12 is therefore inserted at the same time that the switch 11 is broken and the output from the D.C. amplifier is fed back, after suitable adjustment, through plug 12 to supply the vibrating electrometer 8 and keep the tobacco feed control 9 and the recorder 10 where such is provided, in operation.

A few other details of FIGURE 1 will be mentioned now but a full description of the calibrating unit is deferred until the operation of the apparatus is described.

The line 17 leading from the D.C. amplifier to the calibration unit is grounded through a resistance 25 having an adjustable contact 26 thus providing an input/output matching circuit for the electrometer 8 so that the voltage at the input to 8 is unaffected when 13 is in circuit (other than being −1). The contact 26 is connected to a resistor 27 which in combination with a capacitor 28 provides a control-stabilising time constant.

The end of the line 17 is grounded through a resistance 29 provided with adjustable contacts 30 and 31 for the leads to the power amplifiers 19 and 21 to permit the amplitude of the chart trace and the amplitude of the contact stylus to be adjusted.

The function of the gauge 3 is merely to balance the gauge 1 at standard rod mass and as it and its normal connections, particularly the capacity of its cable, would impair the rapid inputs necessary for high speed recording a resistor 32 is inserted in series with its cable to offset the effects of cable capacity and to reduce random noise from the balancing unit. The chart drawn by the recorder 20 can be studied visually for certain purposes but it is a very tedious business as the chart shows a very large number of sweeps across the centre line and for general purposes it is often sufficient to have a record of the cigarettes produced, divided into groups of different weights. For this purpose the moving coil contact stylus is provided with electric contacts dividing an equivalent chart width into different strip areas or zones, and the stylus has associated with it a contact making device which can engage said electric contacts and means are provided whereby the time the pointer of the recorder 20 spends over each zone is recorded. Five zones are provided in the apparatus being described and for each zone there is provided one of the recording meters previously mentioned. There is also the total meter which runs all the time and gives a reading which is the total of the readings on the other meters.

The recording meters are known as electrical integrators and each consists of a small D.C. permanent magnet motor coupled to a clock train with a pointer fixed to its output spindle and rotatable over a graduated dial. A manually adjustable pointer is also provided to afford a datum or zero for each run of a meter. While the armatures of the motors are quite small they nevertheless possess some inertia and run very fast and as the apparatus is intended to give results of the highest posssible accuracy this inertia and the corresponding sluggishness in armature response at starting needs to be compensated. As a particular electric contact is engaged by the contact on the stylus, an associated relay starts the corresponding motor. As the stylus contact moves off said electric contact the relay stops the current to the motor and short-circuits the armature but this short-circuit includes a resistance and the latter can be adjusted by trial to cause the motor to stop in the same time as it needed to run up to speed. The motor for the total meter is dynamically braked in a similar manner. Thus the inevitable inertia lags are compensated for.

The zonal recorder will now be described in detail.

Figure 2:
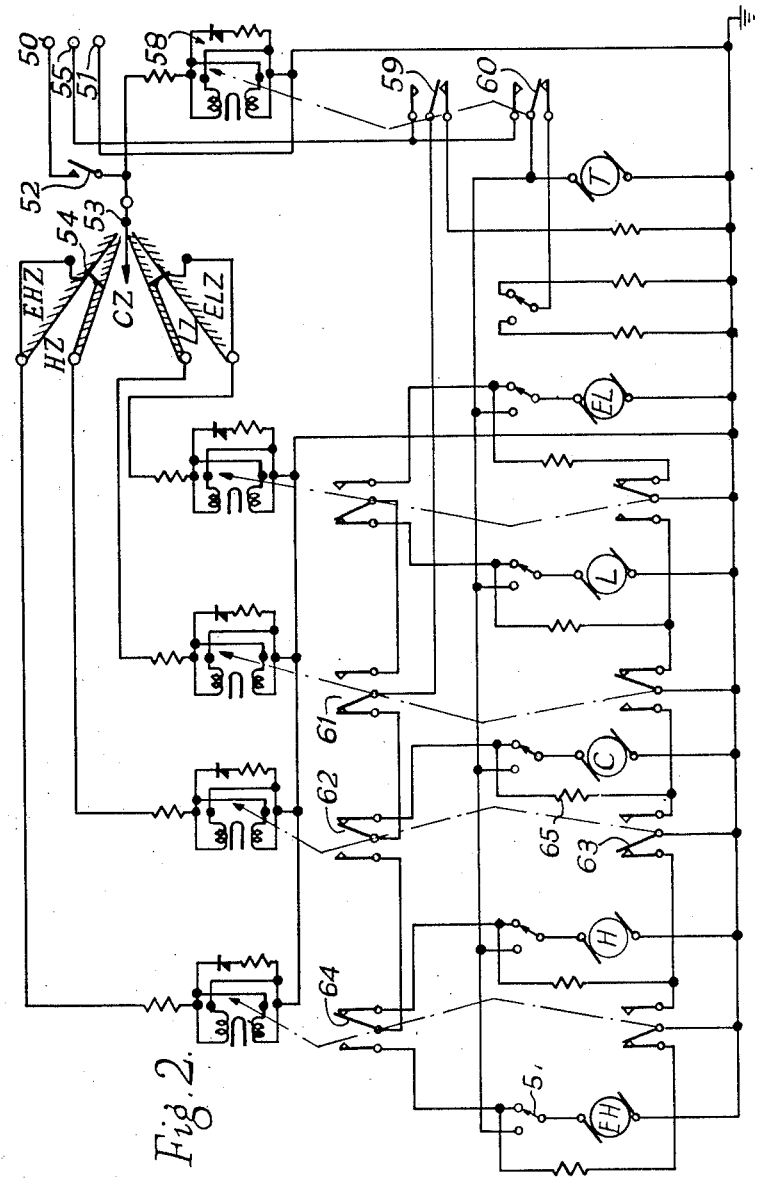
FIGURE 2 is a diagram of a zonal recorder shown in FIGURE 1 and its connections with a number of dial indicators known as integrating meters.

Referring now to FIGURE 2 it will be apparent on inspection that the four integrating meters E.H.-H-L-E.L. are alike and provided with similar control devices.

Current from a terminal 50 passes around the relay circuits as will be described presently, the return or negative side, which is grounded, going to the terminal 51. A main switch 52 in the lead from terminal 50 is provided to switch the whole device on or off. From switch 52 the supply is to a pivoted arm 53, which constitutes a contact making stylus in cooperation with segments such as that marked 54. The arm 53 is shown at about the middle of a wide sector-like zone marked C.Z. and any swinging of the arm within this zone will be regarded as covering an unavoidable tolerance in cigarette weights, which is well within commercial requirements. The several zones over which the stylus passes are marked E.H.Z. and so on, that is, the same letters are used as are on the meters with the addition of Z for the word zone.

When the switch 52 is put on there is also a supply available for the integrating meters E.H.-H-C-L-E.L. and T, which operate at a lower voltage than the relays shown and for this purpose a terminal 55 provides the positive, with return as before to terminal 51.

As illlustrated the circuit is dead but six switches, like the one marked 57, and which are manually operated, are shown in the running position.

As switch 52 is closed there is a circuit from terminal 50 to a relay 58 and its contacts 59 and 60 change over. Thus the terminal 55 can now feed current through contact 60 to the meter T and this meter will run all the time the apparatus is working and its needle position will record the total time that elapses between switching on and switching off. Assuming that the cigarette rod is within the correct tolerance for some time the arm 53 will remain in zone C.Z. While this is the case the meter C will be running. Current is fed to it from terminal 55 and relay contact 59 through other relay contacts 61 and 62 which belong to relays appertaining to H and L zones, said relays being of course dead while the arm 53 is in zone C.Z. Any shift of arm 53 out of C zone must be into H or L zones and thus contact 61 or 62 will break and current is cut off from meter C. Assume the movement is to H zone. The corresponding relay contact 62 will change over and so will another contact of the same relay, marked 63. It will now be seen that the meter C is dynamically braked by armature current passing round a closed circuit containing a resistance 64. This resistance is adjustable and its function is to regulate the stopping time lag to the value of the inertia lag previously mentioned. Adjustment is by trail and error in the first assembly of the apparatus.

It will be understood that movement of the arm 53 from zone C to zone L will have consequences similar to those just described with reference to the passage into zone H. Further it will be appreciated that once the arm is in a new zone the meter in that zone will start operating. Supposing then that the arm has moved into H zone, there will be a supply through relay contacts 59, 61 and 62 (which latter will have moved over from the position shown as the relay belonging to H zone has been energised) and through contacts 63 to the meter H and thence to the negative return. If the arm then shifts to zone E.H.Z. the meter H will be dynamically braked and the meter E.H. fed through contact 63 which will have changed over.

In this way all rod of proper mass will be recorded, as time, on meter C while periods of deviation into the other zones will be recorded on the respective meters and the total should be equal to that shown on meter T. Since the rod travels at a uniform rate it is easy to calculate how many cigarettes have been made in each zone during the total period of investigation.

A "pen" 120 moves laterally of a travelling paper web indicated in FIGURE 1 in block 20 having longitudinal lines dividing the width into strips representing variations in mass of the rod. In practice the pen is a metal point making contact with the paper and in circuit with a suitable supply to give an electrolytic trace. This pen and also the arm 53 which effects contact making to record the time spent in the various zones are each operated by a moving coil swinging in a magnetic field.

Referring again to FIGURE 1, the calibrating unit is provided for determining the amplitude at which the integrator zones are operating. First the chart amplitude is checked with respect to the known ionization current and then a switch knob 164 is manipulated and the arm 65 is moved from the full line position to the broken line position. A battery 66 provides power and the current direction can be reversed by moving knob 164 first to make contact of its switch bars 67 with one set of the contacts shown and then moving the knob back to make the bars 67 contact with the other set of contacts. Thus the battery P.D. across a resistance 68 can send current through the resistance first in one direction and then in the other. A movable contact 69 (shown as a flexible lead) can be used to adjust the voltage to be applied to the recorder 20 and a trace will be made by the pen first on one side of the zero or centre line of the chart and then on the other side of the zero line.

The D.C. amplifier 13 used is a relatively simple apparatus and suffers from "drift" in the known manner. This drift is unimportant for the present use because the operating period, a few minutes only, is so short that the effects of drift are not enough to be troublesome.

The D.C. amplifier shown is powered by batteries as the equipment so far described is designed to be portable so that it may be carried from machine to machine for checking purposes. It has to be mouted on a machine to keep the signal cable length as short as possible because the cable length is the controlling factor for a fast response. This procedure is not entirely satisfactory for a large machine room and in a modified arrangement each machine will be provided with an impedance converter (a simple two-tube apparatus being sufficient) and connections from these units will be led to a central monitoring point where all the basic analysing equipment will be installed. Power for the converters will also be fed from this point.

Figure 3:
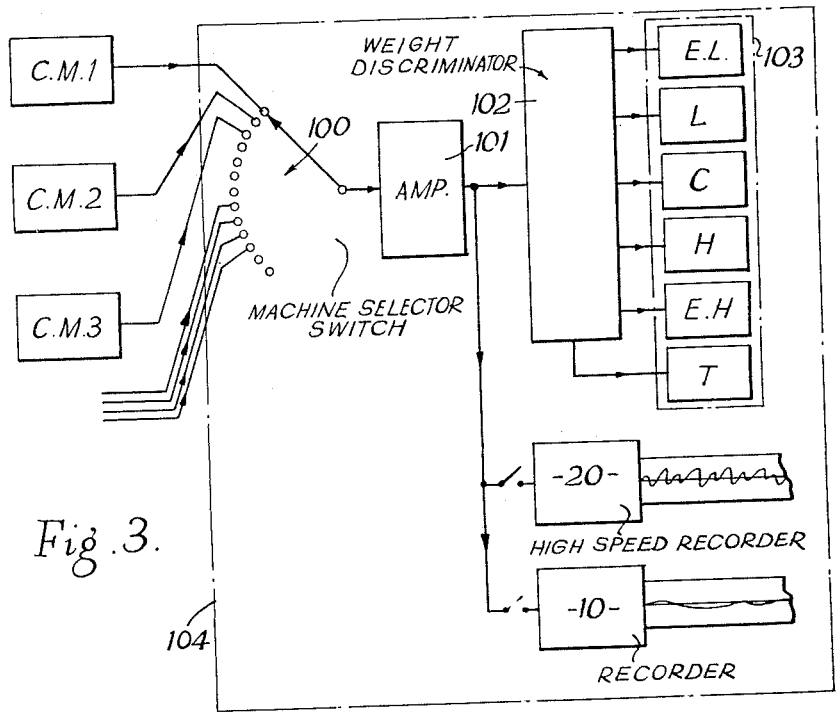
FIGURE 3 is a diagram of the general layout of apparatus where a central recorder can be connected to any machine in a cigarette machine room in order to investigate the performance of the machines in turn.

This system which provides monitoring equipment for a large cigarette room is diagrammatically shown in FIGURE 3 and will be explained to illustrate the broad principles whereafter more detailed description will be given with reference to FIGURES 4 and 5.

As far as possible items which are identical with those already described with reference to FIGURES 1 and 2 bear the same references. In FIGURE 3 C.M.1.-C.M.2-C.M.3 represent three cigarette making machines in a workroom. The apparatus to be described will handle up to fifty machines but a lower number is really preferable as the personnel at the central monitoring point may have a good deal of work to do at times and since the purpose of the system is the analysing of the performance and the effective control of a batch of machines it is desirable that every machine of a batch shall be subjected to test without undue delay. It will be seen that each cigarette machine, which is supposed to be equipped with a measuring device affording an electrical signal, for example a radiation gauge as in FIGURE 1, is connected by a line to a separate stud of a machine selector switch 100. Other lines leading to other machines are also indicated. The signal from the selected machine goes to some suitable kind of amplifier 101 and the output therefrom goes first to a weight discriminator 102 which feeds counters shown enclosed in a broken line 103 and similar in purpose to the integrating meters in the block 24 of FIGURE 1.

The amplifier output also feeds a high speed recorder 20 and a slower one 10 as in FIGURE 1, and these can operate jointly or separately by manipulation of the switches shown. The curve given by recorder 10 is an indication of collective weights (the weight of a given batch of consecutively made cigarettes) while the curve of recorder 20 shows individual cigarette weights.

The broken line 104 is intended to show that the equipment enclosed therein is located at the central station. Each cigarette machine, in addition to its normal radiation gauge, which is employed in the known manner to control the average cigarette weight at the desired mean, has a small high-speed amplifier which is switched on when the arm of the selector switch 100 is turned to the stud for said machine. This operates the high speed recorder as explained with respect to FIGURE 1. The low speed recorder 10 although shown at the central station could be left on the cigarette machine, as usual, as the chief purpose of the station is analysis of individual weights. When the machines are operating and it is desired to test them, the selector switch is turned to the stud of the first machine to be included in the test. A key (not shown) is closed and the apparatus starts counting and continues for a preset time or, rather, a preset number of counts. At the end of the count which is preferably 1000 or 10,000, so that the indicated weights can easily be expressed as percentages, the apparatus stops. Further it will not operate unless cigarettes are being made and thus will stop if a machine breaks down during an analysis period. Then the switch is turned to the next machine and the process is repeated. The information from the counters can be used directly, or converted into standard deviation.

From the weight category figures registered the standard deviation can be found by using a conversion chart, although normally the percentages "correct" and "extreme" will give a more sensitive assessment of machine performance. The same chart will also give from the figures the deviation, if any, of the mean weight from the correct mean weight. Changeover switches (not shown) enable one or both of the "Heavy" categories to be switched to the "Light" side, or vice versa, to enable the skewness of a distribution to be seen in greater detail.

With an equipment of this type, the most important requirement is stability of mean weight which is dependent on constant ionization current. The central monitoring equipment therefore includes means for checking the ionization current from each machine during periods such as meal times when no rod is in the scanning unit.

If the recorded figures show an abnormal performance, a further run is made on the same machine with the chart recorders in circuit. If the abnormal performance is repeated the charts produced can be inspected and templates can be used to see if the weight variations are cyclic, and if so from which parts of the making machine they originate.

The basic system used for analysis comprises a fixed frequency oscillator running at 1000 cycles per second, the output pulses being fed, whilst the cigarette machine is running into one of a number of electronic pulse counting channels (that is the weight discriminator) and finally to the electro-mechanical counters. The rapidly varying D.C. signal from the high speed electrometer with a time constant to give an approximation to one cigarette length is amplified to a high voltage level by a drift corrected D.C. amplifier and at any instant it is the magnitude and polarity of this voltage which determines which of the counting channels shall receive the pulses from the fixed frequency oscillator. The total counters can be set to any predetermined number of counts. Once started the equipment continues until the preset number of counts has been made. Since the total counter is normally set to count 1000 or 10,000 counts, at the end of the run the figures shown on the category counters are the percentage of time and also the percentage of individual cigarettes which are outside the preset limits.

Experience in analysing individual cigarette weight variation both by electronic and gravity balance methods shows that the weight variation is not truly random unless a total of some 1000 cigarettes are weighed, so that with less than 1000 weighings, finding a reliable measure of standard deviations from four counting categories may not be sufficient. With the electronic system outlined above the accuracy of the zonal limits is exceedingly high, further, a large number of cigarettes are analysed and it is found that with the machine running in good order the distribution is random and the standard deviation can be assessed accurately from the four categories by means of the special scale provided.

Following this outline of the system employed, details will now be explained with reference to FIGURES 4 and 5.

Referring first to FIGURE 5 the gauges 1 and 3 of FIGURE 1 are shown at the left-hand side of the figure while the box marked 111 contains the switch device 11 and resistance 32 of FIGURE 1. The vibrating reed electrometer 8 and tobacco feed control 9 are as before. The selector switch of FIGURE 3 is, in fact, ganged as shown at 100 A, B, C, D, in FIGURE 5.

The D.C. electrometer amplifier 13 of FIGURE 1 is here modified and shown in separate parts the electrometer being marked 13A and the D.C. amplifier 13B. A line from the electrometer 13A goes to a stud of 100B and thence to the D.C. amplifier and a return from the amplifier goes to a stud of 100C and thence to earth, to reduce hum. Output from the amplifier 13B goes to a cathode follower 105 and thence to the high speed recorder 20.

Branching from the lead between 13B and 105 is a line leading to a divided rectangle 106 bearing the sub-references E.L, L, C, H, and E.H. The rectangle represents a group of discriminators, herein termed zone gates, and these correspond in function to the weight discriminator of FIGURE 3. Another lead from between 13B and 105 goes to a stud of 100A as a signal return line.

107 is a pulse generator comprising an oscillator, set to produce 1000 pulses per second. A line from 107 leads to the zone gate group 106 where it divides into five channels and a branch from this line leads to a divided rectangle marked 108. The seven divisions of the rectangle stand for seven dekatrons capable of counting up to one million. From the rectangle 108 another line leads to a rectangle 109 which contains a thyratron control arranged to stop the oscillator at the end of a given count. A line (shown single) leads from each of the divisions of the rectangle 106 to similar divisions in a pair of rectangles 110. Twin rectangles correspond to a pair of dekatrons, one counting units and the other tens and lines from the right-hand set of dekatrons pass to electro-mechanical counters shown as a divided rectangle 112 and marked with the same range of letters as 106 and 110. A switch 113 is provided; as shown it is positioned to start a count, while in the lower position it will reset the counters and other parts ready to start a fresh count. For this purpose the switch is connected to a main control unit at 114 from which a line branches to the zone gate group 106 and the dekatrons at 110. Another line from 114 goes to a stud of 100D and then to the coil of a relay 115 in box 13A which operates its contacts shown therein. 116 is a control box while 117 and 118 are devices used to check and adjust any drift in the D.C. electrometer.

*General Description and Operation of the Apparatus*

The high speed electrometer 13A fitted to each machine enables the output signal to have a time constant within the range 15 to 50 milliseconds (instead of 2 seconds minimum with the electrometer 8) so that it can follow rapid changes in the weight of the filler, normally the cigarette rod. The low output impedance of the electrometer 13A enables the output signal to be fed over long distances (300 to 400 yards) to the central station.

Normally the control relay 115 in the electrometer 13A is deenergized and the signal from the scanning unit 1 is passed straight through to the electrometer 8 for normal control of the machine.

Figure 4:
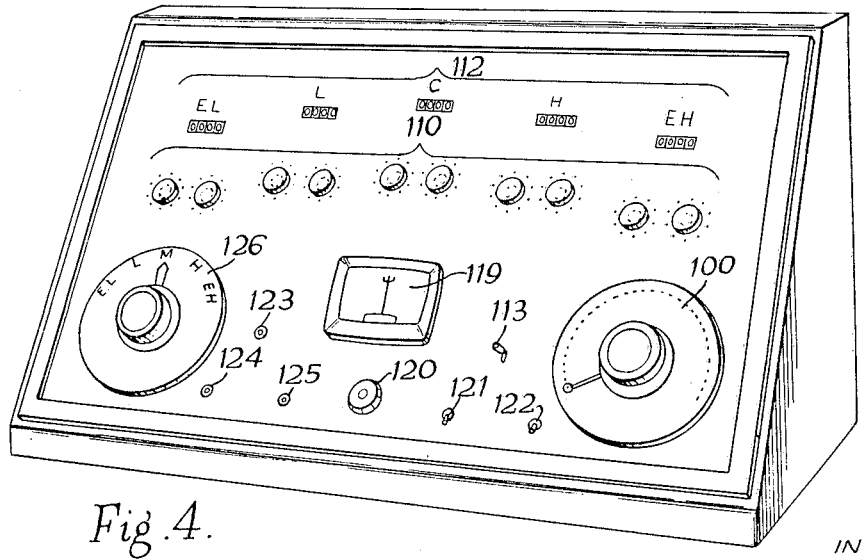
FIGURE 4 is a perspective view of a control desk.

With the control relay 115 energized from the central desk, FIGURE 4, the signal from the scanning unit 1 is passed through the high speed electrometer 13A to the central station equipment; where it is amplified to the required level by amplifier 13B for analysis and for the high speed chart recorder 20, and then modified before being fed back to the electrometer 8 so that the machine is still controlled whilst it is being analysed.

As previously mentioned the oscillator 107 is normally set to produce 1000 pulses per second, and each pulse must go into one of the five counting channels. It is the magnitude and polarity of the signal from the machine, i.e. the instantaneous deviation of the rod weight from the nominal weight which determines which channel counts. Whilst the signal voltage is within the limits of the correct zone the pulses pass into this zone; when the signal voltage is greater, the pulses pass into one of the other zones, which zone depends on the magnitude and polarity of the signal voltage at the instant the oscillation pulse is produced. Any type of discriminator able to perform with the necessary accuracy will suit.

Since a single cigarette takes 30 to 50 milliseconds to pass through the scanning unit the signal voltage is sampled this number of times for each cigarette length and the measuring accuracy is high.

The equipment is set to run for a preset number of pulses by switches for setting the dekatrons 108 and because of the pulse frequency a fixed length of time, normally 100,000 pulses, that is 100 seconds or say the time to make about 2000 cigarettes. This period is long enough for the distribution of individual weights to be gaussian. At the end of the period the equipment automatically stops counting as explained later. Providing the equipment sensitivity and time constant is set properly and the machine runs at constant speed the final display on each counter will be the percentage of "cigarettes" within each category. Normally the "correct" zone is set to span plus or minus one standard deviation, the heavy and light zones to span two standard deviations whilst the extreme zones count "cigarettes" outside two standard deviations. Thus the final readings, if the machine's performance were exactly normal and with correct mean weight would be:

| | Percent |
|---|---|
| Extra light | 2.5 |
| Light | 13.5 |
| Correct | 68 |
| Heavy | 13.5 |
| Extra Heavy | 2.5 |

Normally the information as presented will be adequate, but if the actual standard deviation is required this, and shift of the mean weight, can be found by using mathematical probability paper.

It must be noted that for convenience in handling the data provided by the counters the percentage in the light zone includes the percentage in the extra light zone, and similarily the percentage in the heavy zone include the extra heavy percentage. Therefore when checking that the zones total up to the preset count, only the light, correct, and heavy counts must be added together.

Reversing switches are fitted to the circuits for the four outer zones, to enable one or both of the zones on each side to be thrown to the other side to enable the skewness of a distribution to be examined in greater detail.

Assuming the discriminators are set to count as follows:

Extra light _____ More than 4% light.
Light _____ 4% to 2% light.
Correct _____ 2% light to 2% heavy.
Heavy _____ 2% to 4% heavy.
Extra heavy _____ More than 4% heavy.

the reversing switches are set so that:

The extra light when reversed counts those exceeding 5% heavy and the light when reversed counts those exceeding 3% heavy. The outer heavy zones are similarly arranged when it is desired to transfer them to the light side.

Preset potentiometers are provided for setting any of these limits, as required that is, the widths of the respective zone gates of the discriminator are changed. The widths of the gates shown in the above tables are set so that standard deviation may be reckoned from the numbers falling into each zone and shown on the counters. The gates on the heavy side are operated by negative-going signals and chosen as channels for the pulses according to the strength of the signal voltage which rises as the mass of the filler departs from the correct mass. In a similar manner the gates on the light side are operated by positive-going signals. The signal input to the discriminator is the same in phase as the output from the ionisation chamber because the signal is inverted in the electrometer 13A and again in the amplifier 13B. It will be understood that the width of the correct gate is determined by the settings of its neighbours, that is the light and heavy gates.

It will be realised that should all the four outer zones be switched to one side that it is then the sum of the correct and the first inner zone that will add up to the preset count and further, the correct zone will now count the percentage from the 2% limit one side to infinity on the other side.

The high speed recorder should only be used for any length of time when the performance of a machine is abnormal. The chart speed of the collective recorder is quite slow and it can be run continuously when of course its chart will show at any given time the collective weight of the machine under test.

Operation of the apparatus is effected in the following stages:

(1) Setting total count dekatrons 108. This is effected by the switches mentioned earlier, to settle how long the test shall last. It will be understood that the oscillator frequency is kept as constant as possible.

(2) Setting the selector switch 100 to the number of the machine it is desired to test.

(3) Checking any D.C. drift of the machine high speed electrometer by the device 117. Drift is shown on the meter 119 of FIGURE 4. Any drift can be corrected by the device 118.

(4) Connecting the chosen machine to the central station for full electrical connection by operation of the switch 113, that is moving it to the "start" position; the one occupied in FIGURE 5. This switch movement operates the relay 115 of the machine electrometer 13A so that its contacts take the position shown in FIGURE 5 whereby the signal from the ionisation chamber of the gauge 1 is fed to the central station from the electrometer 13A. Normal tobacco feed control is still maintained by 8 and 9 because the signal is returned through the stud of 100A from the D.C. amplifier 13B. At the same time the pulse generator 107 is permitted to deliver pulses because the control of the oscillator by the thyratron control 109, which operates to mute the pulses at the end of a test, as explained in No. 5 below, is removed.

Thus, the oscillator output passes to the discriminator 106 and passing through the appropriate gate, as selected by the signal, operates the dekatrons 110 and counters 112. There is a controlled wait of a few milliseconds before the count starts, to allow random noise, caused by switching, to disappear before counting and recording take place.

(5) Stopping the count at the end of a test. At the end of the count the thyratron control 109 is operated by control from the dekatrons in 108 which alter the grid potential of the thyratron when all "0" cathodes of the row of dekatrons are fired simultaneously. This effect is used to stop the oscillator 107 from delivering pulses, that is it is muted. This muting effect is supplemented from the main control unit 114 so that when the thyratron is reset for another test, see No. 4 above, the oscillator remains muted until the start of the next test.

(6) Resetting zone counters to zero and setting the total counter, dekatron set 108, for the desired count for the next test.

When the switch 113 is changed from "start" to "reset" the thyratron in 109 is reset and the counters in 112 are reduced again to zero electrically. Thus the oscillator and the counters are again made ready for a test and similarly the dekatrons in 110 are reset.

(7) Automatic stopping of count and resetting. This is effected by the control box 116 which operates to ensure that if a passing filler, usually cigarette rod, is either not present or has ceased to move, the test is cancelled and the counters and dekatrons returned to zero. It is known from experiment that the signal should fluctuate due to short term irregularities of the filler. If the rod stops, the only "signal" is that due to random fluctuations from the source and these are of much lower amplitude than signals due to rod fluctuations. The control box contains devices which sense a rod signal, or at any rate, sense a signal greater than a preset minimum, which minimum is greater than the peak amplitude of source random signals.

The above mentioned operations are, except for No. 7, all initiated from the control desk at the central station; which is shown in FIGURE 4.

The selector switch 100 is shown with a knob and arm rotatable over a ring of dots, representing machine numbers. In the upper part of the view are the counters 112 and just beneath each counter is the associated dekatron pair of the unit 110 with a ring of dots round each dekatron representing the digits 0 to 9.

At the middle of the desk is the meters 119 and just to its right is the start and reset switch 113. Immediately beneath the meter is a knob 120 controlling the devices 117 and 118 of FIGURE 5 for checking and adjusting the electrometer of the machine under test. To the right of the knob 120 are switches 121 and 122 for switching in the recorder 10 and recorder 20 respectively while to the left of knob 120 are jacks 123, 124 and 125 into which a meter can be plugged to check, zone gate input, amplifier input and amplifier output respectively. The knob 126 with a pointer, at the left-hand side of the desk is provided for checking the gates of the discriminator 106. While the pointer points to M the apparatus is in order for testing a machine but when it is desired to check the gates the knob is turned until the pointer points to the particular gate it is desired to test.

In the introduction reference has been made to the use of pneumatic gauges. In U.S. Patent No. 2,952,262, there is described a gauge comprising an aperture through which a cigarette rod passes with a small clearance and any changes in clearance cause differences in the pressure of air fed into the aperture. This gauge, which strictly speaking measures the size of the rod, could be used for the present purpose as it has been found that there is a fairly close relationship between size and mass in these rods. As it may not be as accurate as the pneumatic gauge first referred to, the choice will depend chiefly on the accuracy of the checking of the machine it is desired to achieve.

It has been previously remarked that inspection of the chart is a tedious business, but it has to be done chiefly for the purpose of finding out if there are any recurrent frequencies, that is periodic abnormalities, in the output. Such indications help to discover faults in the cigarette machine, due chiefly to wear, but possibly due to faulty design or construction. The frequency range in machine error extends from, say $1/60$ cycle to 30 cycles per second and this range is well outside the capacity of normal tuned-circuit frequency analysers. It is therefore proposed as an additional feature of the equipment to provide means for recording the output on a magnetic tape for, say, ten minutes. The tape is then made into an endless band and played back at, say one hundred times the recording speed. This will multiply the aforesaid frequencies and give 1½ to 3000 c.p.s. which may be more easily searched by instruments to find recurrent frequencies.

What we claim as our invention and desire to secure by Letters Patent is:

1. Apparatus for checking variations in a characteristic of rodlike articles containing a filler and produced from a continuous rod comprising a gauge producing an electrical signal which varies with changes in the characteristic of the moving filler in the machine, averaging means to receive said electrical signal and average it over a length of filler substantially equal to the length of the rodlike articles, a plurality of integrator means, each of which corresponds to one of a plurality of contiguous ranges of value of the averaged characteristic, to summate and register the total duration during the test that the averaged signal falls within the range appropriate to that integrator means, a discriminating means to receive the averaged signal and having a plurality of channels, each of which leads to one of said integrator means, and an electrical supply to drive said integrator means and connected to said discriminating means to be switched through the appropriate channel to the associated integrator means whenever the averaged signal is determined by the discriminating means to be within the range of values appropriate to that integrator means.

2. Apparatus as claimed in claim 1, wherein the integrator means register in intervals of time corresponding to the time interval between the production of individual rodlike articles, whereby the integrator means register the equivalent number of rodlike articles having a value of the characteristic in the various ranges of value of that characteristic.

3. Apparatus for checking the individual weight of cigarettes produced by a continuous rod cigarette making machine, comprising a gauge producing an electrical signal which varies with changes in the mass per unit length of the continuous rod produced in the machine, averaging means to receive said electrical signal and average it over a cigarette length of rod, a plurality of integrator means, each of which corresponds to one of a plurality of contiguous ranges of value of mass per unit length, to summate and register the total duration during the test that the mass per unit length falls within the range appropriate to that integrator means, a discriminating means to receive the averaged signal and having a plurality of channels, each of which leads to one of said integrator means, and an electrical supply to drive said integrator means and connected to said discriminating means to be switched through the appropriate channel to the associated one of said integrator means whenever the averaged signal is determined by the discriminating means to be within the range of values appropriate to the integrator means.

4. Apparatus as claimed in claim 3, wherein the integrator means register in intervals of time corresponding to the time interval between the production of individual cigarettes whereby the integrator means register the equivalent number of cigarettes having a weight in the various ranges of value of weight.

5. Apparatus as claimed in claim 3, wherein the electric supply is a fixed frequency oscillator producing pulses, the integrator means are pulse counting means, and the pulses from the oscillator are switched by the discriminating means into the appropriate integrator means.

6. Apparatus as claimed in claim 5, wherein each integrator means comprises both a dekatron and an electromechanical counter.

7. For use with a continuous rod cigarette-making machine having a gauge to sense variations in the mass per unit length of the continuous tobacco filler passing through the machine and to produce an electrical signal which varies with said variations in mass per unit length, apparatus for checking the individual weights of cigarettes produced by the machine, and comprising an amplifier to receive and amplify said signal, said amplifier having a time constant such as to average the signal over a cigarette length of filler, a constant frequency oscillator to produce pulses, a discriminator connected to said oscillator to receive the pulses, the discriminator having a plurality of output channels and being operable to direct the pulses into a selected one of said output channels in dependence on which range of an equal plurality of contiguous ranges of value the signal is within at any time, and an equal plurality of pulse counters, each connected to one of said channels to receive and count the pulses directed into that channel, and having means to register the number of cigarettes made in the time required for production of that number of pulses by the oscillator.

8. Apparatus as claimed in claim 7 for use with a continuous rod cigarette-making machine, wherein the gauge is a radiation gauge, and wherein said amplifier is an electrometer amplifier with a time constant in the range of 15 to 50 milliseconds.

9. Apparatus for checking the weight of individual cigarettes produced by a plurality of continuous rod cigarette-making machines each having a radiation gauge to sense variations in the mass per unit length of the filler passing through the machine and to produce an electrical signal which varies with said variations in mass per unit length, said apparatus comprising an equal plurality of high speed electrometers, each with a time constant in the range of 15 to 50 milliseconds and located at one of said machines, to receive the signal from that machine, an amplifier to receive and amplify the signal from one of said electrometers, a constant frequency oscillator to produce pulses, a discriminator connected to said oscillator to receive the pulses, the discriminator having a plurality of output channels and being operable to direct the pulses into a selected one of said output channels in dependence on which range of an equal plurality of contiguous ranges of value the signal is within at any time, and an equal plurality of pulse counters, each connected to one of said channels to receive and count the pulses directed into that channel, and having means to register the number of cigarettes made in the time required for production of that number of pulses by the oscillator, and switching means to connect said amplifier to any one of said electrometers.

10. Apparatus as claimed in claim 9 for checking the weights of individual cigarettes produced by a plurality of continuous rod cigarette-making machines which each have a further electrometer to receive the signal from the gauge, and control means operable in accordance with the signal from the electrometer to control the amount of tobacco forming the continuous tobacco filler, in the sense to reduce said variations in mass per unit length, said checking apparatus comprising further switching means to disconnect the gauge from the further electrometer when the gauge is connected to the high speed electrometer on that machine, and feedback means to supply a signal to the further electrometer to enable the control means to continue to function during checking of cigarettes produced by that machine.

11. In a cigarette-maker for producing cigarettes from a continuous cigarette rod, means for automatically registering for each of a plurality of different predetermined weight categories a cumulative total of production time occupied by the manufacture of cigarettes in that category, said means including a measuring head positioned adjacent said rod and circuit means connected with said measuring head for generating a measuring voltage related in magnitude to the weight of tobacco in said rod and hence in the cigarettes issuing from the maker, an electrically operated elapsed-time indicator for each weight category, and switch means coupled to said circuit means for operation under control of said measuring voltage for separately and selectively controlling the energization of the respective indicators in accordance with the magnitude of said voltage.

References Cited by the Examiner

UNITED STATES PATENTS

| | | | |
|---|---|---|---|
| 1,996,189 | 4/35 | Biro | 177—22 |
| 2,704,079 | 3/55 | Molins et al. | 131—21 |
| 2,886,714 | 5/59 | Ewald | 250—83.4 |
| 2,946,579 | 7/60 | Innocenti | 177—4 |

RALPH G. NILSON, *Primary Examiner.*

ISAAC G. STONE, *Examiner.*